UNITED STATES PATENT OFFICE 2,659,703

METHOD OF IMPREGNATING A SYNTHETIC RUBBER TO FORM A SPONGE RUBBER AND THE ARTICLE PRODUCED THEREBY

Harry A. Toulmin, Jr., and William R. Stauffer, Dayton, Ohio, assignors to The Commonwealth Engineering Company of Ohio, Dayton, Ohio, a corporation of Ohio No Drawing. Application June 12, 1948, Serial No. 32,736

1 Claim. (Cl. 260—2.5)

This application is a continuation-in-part of the application filed in the names of Harry A. Toulmin, Jr., and William R. Stauffer, Serial No. 771,150, filed August 28, 1947, now abandoned, and entitled "Production of Sponge Rubber and in Particular to the Production of Rubber Foam to Form Vulcanized Foam Rubber Products."

Our invention relates to the production of sponge rubber and in particular to the production of rubber foam to form vulcanized foam rubber products.

It is our object to provide a method of production of rubber sponge from latex, either natural or synthetic, and in the course of such production to prevent the coagulation of the rubber which increases particle size. It has been found that, while the pH value can be controlled for this purpose, yet the average size of the particles increase regardless of such precautions exercised in preserving the latices.

When latex is impregnated with nitrous oxide, particularly synthetic latex such as that made of "neoprene," it has been found necessary to cool the neoprene latex in order to prevent coagulation in the bomb. As natural latex ages and becomes more unstable, it foams less and tends to coagulate more in the bomb. In order to prevent natural latex from becoming unstable before it can be used, refrigeration has been resorted to, although this is undesirable for various reasons including cost and difficulty in mass production.

We have found that the addition of sodium silicate solution in a quantity of up to 20% of the volume of latex prevented coagulation and eliminated the necessity for refrigeration. Additionally, the use of the decelerating sodium silicate, which counteracts sodium silicofluoride (NaSiF$_6$) added to such latices as a dormant coagulant or sensitizer, resulted in balancing the reaction with the latex so that when it was impregnated with nitrous oxide to aerate it and cause it to foam, there was no necessity for re-cause it to foam, there was no necessity for refrigeration and there was no coagulation. An improved product and one of much lower cost resulted thereby, the latter being due to the elimination of refrigeration and to the substitution of the cheaper sodium silicate for more expensive materials.

The sodium silicate used was supplied by The Philadelphia Quartz Company. It was grade PQ-N and had the following analysis:

| | Per cent |
|---|---|
| SiO$_2$ | 28.7 |
| Na$_2$O | 8.9 |
| H$_2$O | 62.4 |

Varying amounts of this sodium silicate were added to, for instance, neoprene latex. There was no coagulation in latex samples which contained relatively large amounts (20% by volume) of the silicate.

With .15 cc. of PQ-N sodium silicate added to 100 cc. of neoprene latex compounded with plasticizer, coagulation took place one minute after the sensitizer was added. When the amount of sodium silicate was increased to .23 cc. per 100 cc. of neoprene latex (other conditions being equal), the latex did not coagulate, but remained a liquid which, however, contained grains of solidified rubber.

By using the nitrous oxide method of foaming on compounded latex containing various amounts of sodium silicate, we have been able to foam this latex without using refrigeration.

By the methods used by us heretofore, the foaming of latex is done in two operations, first, adding the plasticizer and sensitizer to the latex while stirring, and second, incorporating nitrous oxide (N$_2$O) under pressure at 200 p. s. i., and releasing the pressure by bleeding the latex out of the bomb, when the latex is foamed by the release of dissolved nitrous oxide. These operations are usually carried out at about 4° C., which means refrigerating the latex, bomb, and accessories for several hours before experimental runs and keeping the temperature at this point during the runs.

Under our invention, the Waring or mix-blender is used. This is a type of high speed stirring machine (12,000–15,000 R. P. M.) in which the incorporation of the nitrous oxide, with resultant foaming, and addition of plasticizer and sensitizer can be accomplished all in one operation in about three or four minutes, and the foamed latex poured directly into a mold for curing.

By the use of the blender, and the speed stirring, coagulation is still more delayed. This is another factor responsible for eliminating the necessity of refrigeration. The foaming is carried out in one operation instead of the two operations used in the previous methods.

By this method we can eliminate entirely the use of a bomb or closed chamber for the impregnation of the latex with nitrous oxide, although this process works successfully with a bomb or autoclave. One of the difficulties in the use of latex, particularly neoprene latex, for the making of sponge rubber has been its great sensitivity, especially after the sensitizer has been added. This has also been overcome by the instant process.

Example No. 1

Neoprene latex foam was prepared as follows:

50 gms. of an aqueous dispersion of neoprene rubber sold by American Anode Co. were foamed to 150 cc. by introducing nitrous oxide, and then 10 cc. PQ-N grade of sodium silicate were added. There was no coagulation within 5 minutes, the foam became smooth and the bubbles became fine. When 1.2 cc. of sensitizer 40-2 was added, the latex became grainy.

When neoprene latex was compounded as follows:

| | |
|---|---|
| Neoprene latex #140 22087 | 50.0 gm. |
| Plasticizer | ½ cc. |
| Sodium silicate PQ-N | 0.0 cc. |
| Sensitizer (sodium silico fluoride) | 1.0 cc. | with thorough mixing after each addition, and foaming with nitrous oxide coagulation required ¾ of a minute after the sensitizer was added. With 2 drops (0.152 cc.) of PQ-N sodium silicate, the coagulation time for the foam was one minute, with 3 drops (0.228 cc.) of PQ-N sodium silicate, the latex did not coagulate and also with 4 drops (0.304 cc.) of PQ-N sodium silicate, there was no coagulation. These two samples that did not coagulate were cured in a 200° F. oven for 1½ hours. The sponge contained a large amount of small bubbles that were well dispersed.

The plasticizer is a vegetable oil and the foaming agent is a soap solution.

The plasticizer 30-1 referred to hereinbefore and hereinafter is 100% castor oil, while the sensitizer 40-2 is a 25% dispersion of sodium silico fluoride.

Example No. 2

Neoprene latex at room temperature (75° F.) was compounded as follows:

| | |
|---|---|
| Neoprene latex #140-22087 [1] | 600.0 gms. |
| Plasticizer, castor oil | 12.0 cc. |
| Sodium silicate PQ-N | 13.5 cc. |
| Sensitizer, 25% dispersion of sodium silico fluoride | 13.8 cc. |

[1] Contains 88% neoprene.

There was thorough mixing after each addition, $N_2O$ was dissolved at 200 p. s. i. for 3 minutes, the latex was bled from the bomb and allowed to foam. This foam was cured in an oven of 250° F. for 1½ hours.

In these examples the latex compound 140-22087 is a product of American Anode, Inc., of Akron, Ohio, and is a polymerized chloro-2 butadiene 1,3, comprising 53 to 54% solids. The latex contains 88% neoprene on the dry compound and has the further following characteristics: a pH of 10.5 to 11.0; a viscosity #2 Zahn in seconds of 16-22; and a specific gravity of 1.13 to 1.16.

Therefore it will be seen that it is possible by the use of sodium silicate to eliminate refrigeration and by the foaming of latex with a mixer blender at high speed of from 12,000 to 15,000 R. P. M. to incorporate the nitrous oxide; it is also possible to omit the closed chamber or bomb otherwise employed for impregnating the latex with nitrous oxide up to 200 pounds per square inch. This again effects a great saving in time and overcomes the difficulty of handling.

After the aerated latex has been formed, the sponge is vulcanized in suitable shapes in open molds or in sheets as may be desired.

This method provides a sponge with a wide dispersion of bubbles of uniform size and disposition which gives a highly resilient but strong sponge rubber. It makes it possible to deliver the foam material where desired through pipes. As has been mentioned before, it also eliminates all refrigeration, closed molds and pressure bombs, thereby bringing the cost of sponge rubber down to a point where it can be economically and widely used.

The regular curing time of the foamed rubber product is 1½ hours at an oven temperature of 250° F. We then wash the sample first with cold tap water until no foam is exuded on squeezing, then rinse by squeezing for about five minutes in 1% hydrochloric acid. Thereafter the hydrochloric acid is removed by washing the sample in cold running water, again by squeezing it for about five minutes. Thereafter we squeeze the sample as dry as possible and cure further for one and a half hours at 250° F.

While natural as well as synthetic rubbers or their mixtures are applicable for the invention, neoprene, polyvinyl chlorides, vinylidene and butadiene base synthetic rubbers are especially satisfactory.

When a closed chamber is used, the mixture is impregnated at from 25 to 250 pounds pressure with nitrous oxide: then released after shaking, stirring, etc. and it foams as released. Thereafter it is vulcanized in this foamed condition.

Under either method, with or without an autoclave, the sponging takes place in the open air and is vulcanized in that condition. The foam will stand from a few minutes to several hours without material change.

It will be understood that we desire to comprehend within our invention such modifications of the apparatus and method and substitution of materials as may be fairly comprehensible within the hereinafter appended claim.

We claim as follows:

In a method of manufacturing sponge rubber, the steps of mixing an aqueous dispersion of polychloroprene latex containing approximately 88% neoprene based on the dry compound, sodium silico fluoride and sodium silicate in the proportion of substantially one part by volume of a 25% dispersion of sodium silico fluoride sensitizer and substantially one part by volume of sodium silicate of the approximate composition $SiO_2$ 28.7%, $Na_2O$ 8.9% and $H_2O$ 62.4%; introducing nitrous oxide under pressure into the mixture, releasing the pressure on the mixture impregnated with nitrous oxide to produce a foamed rubber mass, and curing the foamed mass by the application of heat, the latex dispersion and mixture of silicate and sensitizer being present in the proportion of about 600 grams latex dispersion to 27.3 cc. of the mixture of silicate and sensitizer.

HARRY A. TOULMIN, Jr.
WILLIAM R. STAUFFER.

(References on following page)

References Cited in the file of this patent

UNITED STATES PATENTS

| Number | Name | Date |
|---|---|---|
| 1,828,481 | Trobridge et al. | Oct. 20, 1931 |
| 2,126,273 | Ogilby | Aug. 9, 1938 |
| 2,138,226 | Dales et al. | Nov. 29, 1938 |
| 2,192,318 | Kirby | Mar. 5, 1940 |
| 2,234,672 | Gleason | Mar. 11, 1941 |
| 2,288,190 | Harrison | June 30, 1942 |
| 2,321,111 | Stamberger | June 8, 1943 |
| 2,393,261 | Peaker | Jan. 22, 1946 |
| 2,457,684 | Klemp | Dec. 28, 1948 |
| 2,469,894 | Rogers | May 10, 1949 |
| 2,549,864 | Toulmin | Apr. 24, 1951 |
| 2,567,952 | Lewis | Sept. 18, 1951 |

OTHER REFERENCES

Dales et al., Report No. 39–3, May 1939, Neoprene Latex Type 57, Du Pont. Pages 8 and 9.

Du Pont Rubber Chem. Div., Report BL–201, Aug. 11, 1945, pages 1, 7, and 10.